United States Patent [19]

Kendrick

[11] 4,337,971
[45] Jul. 6, 1982

[54] REMOTE CONNECTOR

[75] Inventor: William D. Kendrick, Duncan, Okla.

[73] Assignee: Halliburton Company, Duncan, Okla.

[21] Appl. No.: 176,220

[22] Filed: Aug. 7, 1980

[51] Int. Cl.³ .............................................. F16L 37/18
[52] U.S. Cl. .................................. 285/315; 285/320; 285/367; 285/371; 285/DIG. 21
[58] Field of Search ............... 285/315, 316, 320, 420, 285/367, DIG. 21, 322, 371

[56] References Cited

U.S. PATENT DOCUMENTS

| 3,071,188 | 1/1963 | Raulins | 285/322 X |
| 3,536,344 | 10/1970 | Nelson | 285/315 |
| 3,591,204 | 7/1971 | Shipes | 285/315 X |
| 3,732,923 | 5/1973 | Fowler | 285/315 |

FOREIGN PATENT DOCUMENTS 541038 9/1955 Belgium .............................. 285/322

OTHER PUBLICATIONS

Gray Tool Co., Catalog No. 66.

Primary Examiner—David Arola
Attorney, Agent, or Firm—John H. Tregoning; James R. Duzan

[57] ABSTRACT

The connector of the present invention comprises a hydraulically actuated connector which may be remotely actuated. The connector of the present invention comprises body means, hydraulically actuated cylinder means surrounding the body means and a plurality of segmental lug means interposed between the body means and cylinder means which selectively engage the end of a flow line.

3 Claims, 2 Drawing Figures

REMOTE CONNECTOR

BACKGROUND OF THE INVENTION

This invention relates to an improved connector for fluid lines and the like.

With the advent of the stimulation of hydrocarbon bearing formation of the earth to improve the production of offshore oil and gas wells and the necessity of controlling blown-out offshore oil and gas wells, it has become increasingly desirable to quickly connect and disconnect, preferably from a remote location, fluid flow lines running from a marine vessel to an offshore exploration or production platform.

In the past, a common method of connecting and disconnecting fluid flow lines running from a marine vessel to an offshore exploration or production platform involved the use of clamps having threaded connectors thereon to secure the ends of the fluid flow lines together. However, the use of clamps having threaded connectors thereon to secure the ends of fluid flow lines together requires the manual assembly of the clamp about the ends of the fluid flow lines and the manual assembly of the threaded connectors about the clamp. One such clamp is available from the Gray Tool Company, Houston, Texas, and is identified by the Gray Tool Company under the trademark identification as a GRAYLOC clamp.

It is further known to use a surface controlled hydraulic connector in sub-sea operations for the remote connection of flow lines. One such connector has been available also from the Gray Tool Company and is known under the trademark identification of the Gray Tool Company as a HYDRALOC connector. However, such a connector is complex in structure, can be difficult to manufacture and, in many instances, cumbersome to use.

SUMMARY OF THE INVENTION

The connector of the present invention comprises a hydraulically actuated connector which may be remotely actuated. The connector of the present invention comprises body means, hydraulically actuated cylinder means surrounding the body means and a plurality of segmental lug means interposed between the body means and cylinder means which selectively engage the end of a flow line.

BRIEF DESCRIPTION OF THE DRAWINGS

The connector of the present invention will be more fully understood from the following description of the invention and drawings taken in conjunction therewith wherein.

DESCRIPTION OF THE INVENTION

Figure 1:
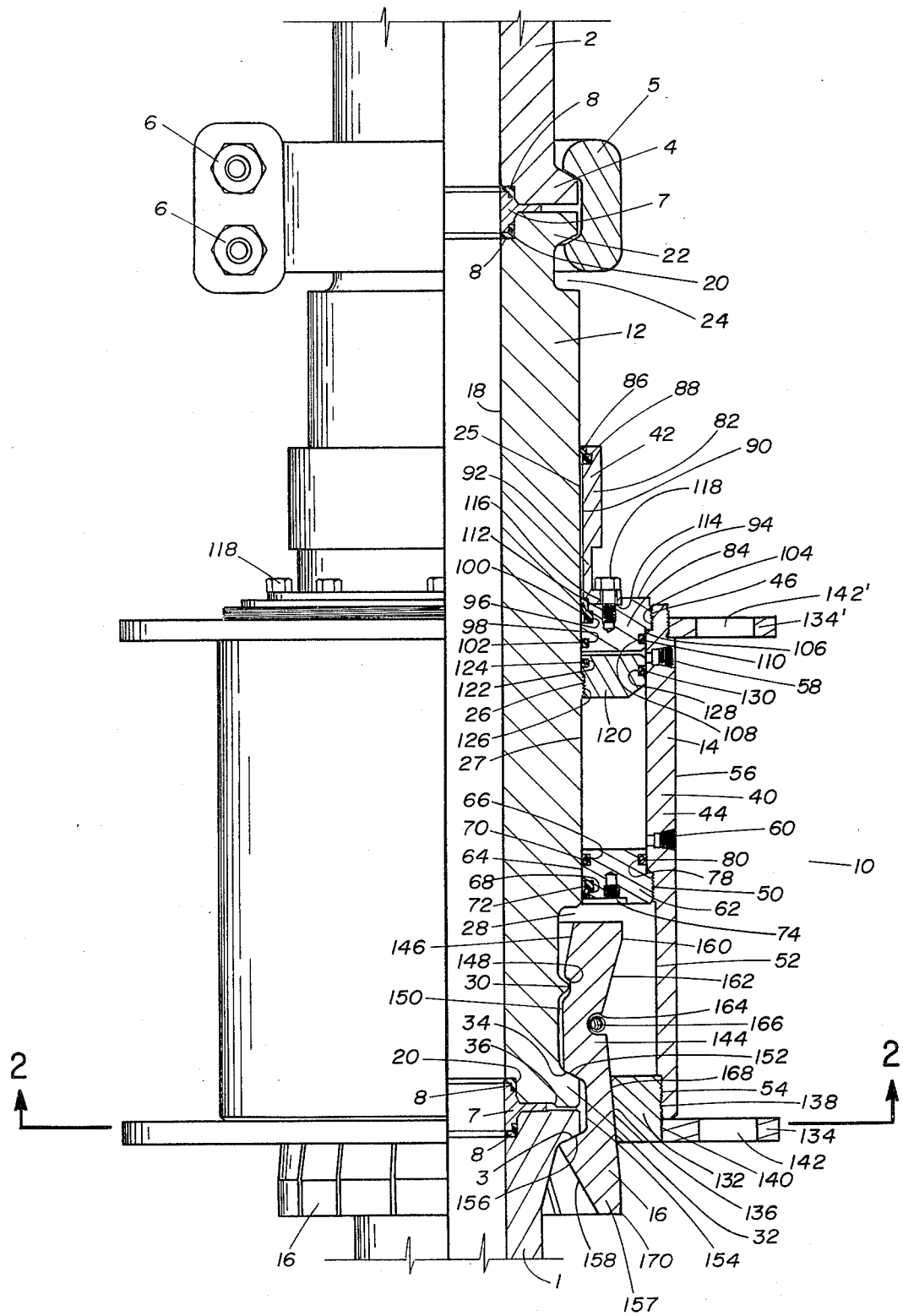
FIG. 1 is a cross-sectional view of the present invention.

Referring to FIG. 1, the present invention is shown in its preferred embodiment.

The hydraulically actuated connector 10 comprises body means 12, hydraulically actuated cylinder means 14 and segmental lug means 16.

The body means 12 comprises an elongated tubular member having a bore 18 therethrough having an annular recess 20 at each end thereof, first flanged end 22 having angular annular shoulder 23 thereon, annular recess 24, threaded portion 26, annular recess 28 having annular circumferential rib 30 therein and second flanged end 32 having angular annular shoulder 34 thereon and annular recess 36 therein. The annular recesses 20 at each end of the bore 18 are formed to receive a portion of seal ring means 7 therein to facilitate the fluid tight connection of the connector 10 to the flow lines 1 and 2.

The hydraulically actuated cylinder means 14 comprises cylinder sleeve means 40 and rod clamp means 42.

The cylinder sleeve means 40 comprises an annular tubular member 44 having first threaded bore 46 therein, a first bore 48 smaller in diameter than first threaded bore 46, second threaded bore 50 larger in diameter than bore 48, second bore 52 slightly larger in diameter than second threaded bore 50 and third threaded bore 54 larger in diameter than second bore 52. Extending from the exterior surface 56 of the annular tubular member 44 and communicating with first bore 48 are first threaded port means 58 and second threaded port means 60. Secured to second threaded bore 50 of the annular tubular member 44 is end cap piston means 62.

End cap piston means 62 comprises an annular piston member having a bore 64 therethrough which has annular recesses 66 and 68 receiving seal means 70 and 72 respectively therein which, in turn, sealingly engage exterior portion 27 of the body means 12, having annular recess 74 in one end thereof, having threaded exterior portion 76 which threadedly engages second threaded bore 50 of the annular tubular member 44, and having exterior annular recess 78 which receives seal means 80 therein which, in turn, sealingly engages first bore 48 of the annular tubular member 44.

Rod clamp means 42 comprises an annular tubular member 82 and annular end cap piston means 84. The annular tubular member 82 comprises an annular sleeve having annular recess 86 which has seal means 88 therein sealingly engaging exterior portion 25 of the body means 12, having bore 90 therethrough and having exterior flange means 92 having a plurality of apertures 94 therein. Annular end cap piston means 84 comprises an annular member having in the bore thereof annular recesses 96 and 98 having, in turn, seal means 100 and 102 therein respectively engaging exterior portion 25 of body means 12, having threaded exterior portion 104 threadedly engaging first threaded portion 46 of annular tubular member 44, having exterior portion 106 having, in turn, annular recess 108 therein having seal means 110 sealingly engaging first bore 48 of annular tubular member 44 and having a plurality of threaded apertures 112 in annular recess 114 in annular end surface 116 thereof.

Annular tubular member 82 and annular end cap piston means 84 of the annular body sleeve 42 are secured together having exterior flange means 92 of annular tubular member 82 being partially received within annular recess 114 of annular end surface 116 of annular end member 84 and having a plurality of threaded fastening means 118 extending through apertures 94 in exterior flange means 92 having a portion thereof threadedly engaging threaded apertures 112 of annular end member 84.

Secured to threaded portion 26 of body means 12 is abutment piston means 120. The abutment piston means 120 comprises an annular member having in the bore thereof recess means 122 having, in turn, seal means 124 therein sealingly engaging exterior portion 25 of body means 12, having threaded portion 126 threadedly engaging threaded portion 26 of body means 12 and having recess means 128 in the exterior surface thereof having, in turn, seal means 130 therein sealingly engaging first bore 48 of annular tubular member 44.

Engaging third threaded bore 54 of annular tubular member 44 are lug cone forcing means 132 which also threadedly engages flange ring means 134. A flange ring means 134' also threadedly engages the exterior of the cylinder sleeve means 40 on the end thereof opposite the end engaging the cone forcing means 132. The lug cone forcing means 132 comprises an annular member having a tapered bore 136 therethrough and threaded exterior surface 138 which has a portion threadedly engaging third threaded bore 54 of annular tubular member 44. Flange ring means 134 comprises a flat annular member having a threaded bore 140 threadedly engaging a portion of threaded exterior surface 138 of lug ring means 132 and having a plurality of apertures 142 therein.

Disposed about one end of body means 12 being partially received in annular recess 28 thereof are a plurality of segmental lug means 16. The segmental lug means 16 each comprise, on the interior thereof, an elongate member 144 having a first tapered surface 146, having a recess 148, having a first flat horizontal area 150, having second tapered surface 152, having a second flat horizontal area 154, having third tapered surface 156, and having fourth tapered surface 158 and, on the exterior thereof, having a first flat horizontal area 160, having first tapered surface 162, having recess 164 receiving circumferential spring means 166 therein, having second tapered surface 168 and having second flat horizontal area 170. It should be understood that on the interior of each segmental lug means 16, the second tapered surface 152 and third tapered surface 156 are formed at complementary angles to engage angular annular shoulder 34 of body means 12 and the angular annular shoulder 3 of a flow line 1 to be engaged by the connector 10.

Although not shown in FIG. 1, each segmental lug means 16 includes a spacing means 17 secured thereto to maintain the proper arrangement of the segmental lug means 16 about the flanged end 32 and the recess 28 of the body means 12.

It should be further understood that the various seal means referred to may be any suitable type seal means, such as an annular elastomeric O-ring type seal means or an annular elastomeric wiper type seal means.

As further shown in FIG. 1, the first flanged end 22 of the body means 12 is secured to the flanged end 4 of a flow line 2 by means of a clamp 5 having threaded fastening means 6 securing the same. Interposed between the flanged end 4 of the flow line 2 and the flanged end 22 of the body means 12 is a suitable seal ring means 7 having resilient sealing means 8 thereon. The other flanged end 32 of the body means 12 also utilizes a suitable seal ring means 7 to sealingly engage the end of a flow line 1. The flanged ends 22 and 32 of the body means 12 may be formed in any suitable configuration to mate with the flow lines 1 and 2.

Figure 2:
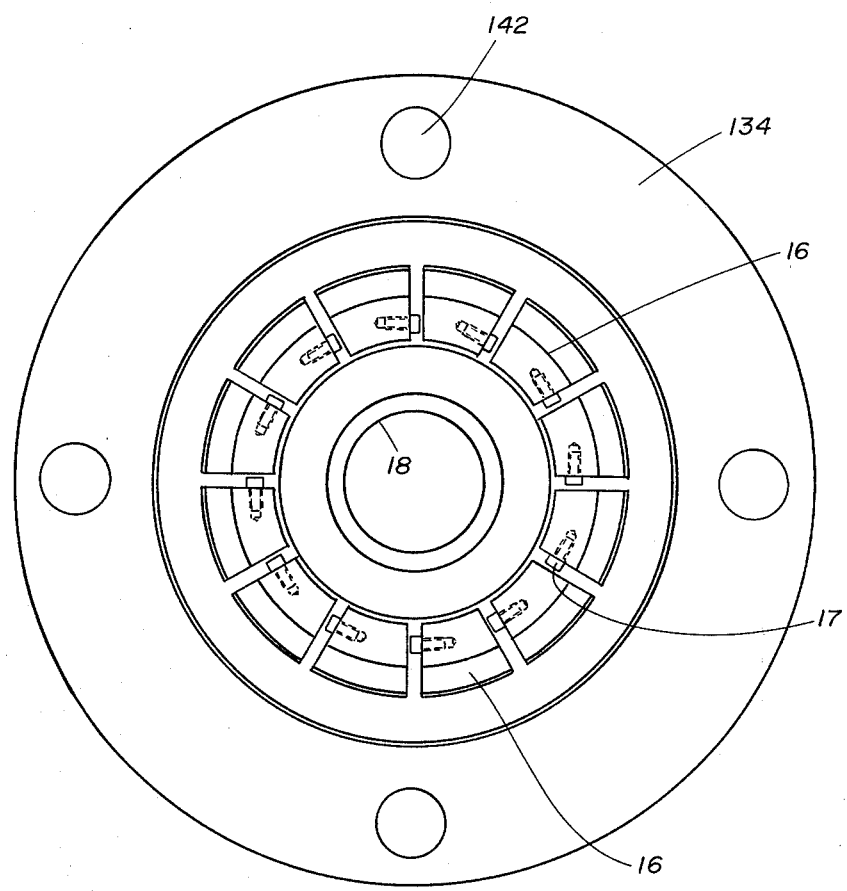
FIG. 2 is a view taken along line 2—2 of FIG. 1 omitting items 1 and 7 for clarity.

Referring to FIG. 2, the connector 10 is shown having the flow line 1 and seal ring means 7 removed therefrom. As shown, the segmental lug means 16 have spacing means 17 therebetween to prevent each segmental lug means 16 from contacting adjacent segmental lug means and to distribute the segmental lug means 16 about the body means 12. If desired, the spacing means 17 may be omitted.

Operation of the Connector

After connecting the connector 10 to a flow line 2 by means of a suitable clamp 5 and seal ring means 7, a flow line 1 having a suitable seal ring means 7 therewith may be connected to the connector 10.

In its open position the connector 10 has the end cap piston means 62 of sleeve means 14 abutting abutment piston means 120 and has tapered bore 136 of the lug cone forcing means 132 engaging first tapered surface 162 of the segmental lug means 16 causing each segmental lug means 16 to pivot about circumferential lug 30 until tapered surface 146 abuts the bottom of annular recess 28 of body means 12, thereby causing the end 157 of each segmental lug means 16 to be cammed outwardly from the body means 12 to allow a flow line 1 having a suitable seal ring means 7 to be assembled with body means 12. To move the connector 10 to its open position, a suitable source of fluid pressure is attached to the sleeve means 14 of the connector 10 via threaded inlet port 58 and fluid pressure is applied through threaded inlet port 58 between the abutment piston means 120 and annular end cap piston means 84, thereby causing the sleeve means 14 to translate along the exterior surface of body means 12 until the end cap piston means 62 of the sleeve means 14 abuts abutment piston means 120.

After a flow line 1 and seal ring means 7 have been assembled in abutting relationship to the body means 12 of the connector 10, to secure the flow line 1 to the connector 10, first, the fluid pressure is released from the area between the end cap piston means 62 of the hydraulically actuated cylinder means 14 and abutment piston means 120 with the fluid being contained in such an area being vented to a suitable reservoir, then a suitable source of fluid pressure is attached to threaded inlet port 60 of the hydraulically actuated cylinder means 14 and fluid pressure is applied through threaded inlet port 58 between stationary abutment piston means 120 connected to the body means 12 and end cap piston means 62 connected to the sleeve means 14, thereby causing the hydraulically actuated cylinder means 14 to translate along the exterior surface of body means 12 until annular end cap piston means 84 abuts abutment piston means 120. During the translation of the hydraulically actuated cylinder means 14 along the body means 12 since the segmental lug means 16 are biased by spring means 166 and pivot about circumferential lug 30 and since the lug cone forcing means 132 disengages first tapered surface 162 of the segmental lug means 16, the lug means 16 pivot about circumferential lug 30 until second tapered surface 152 and third tapered surface 156 abut angular annular shoulder 34 of the body means 12 and angular annular shoulder 3 of the flow line 1, respectively, and tapered bore 136 of the lug cone forcing means 132 abuts second tapered surface 168 of the segmental lug means 16, thereby preventing the lug means 16 from pivoting about circumferential lug 30 of body means 12 to release the flow line 1 from the connector 10.

To release the connector 10 from the flow line 1, fluid pressure is merely released or vented through threaded inlet port 60 while being applied through threaded inlet port 58.

It will be readily apparent from the foregoing that the connector of the present invention is simple in construction, simple in operation and may be utilized in any environment where it is necessary or desirable to remotely connect flow lines.

Having thus described my invention, I claim:

1. A hydraulically actuated connector releasably joining a first flow line to a second flow line in a fluid-tight relationship, said connector being releasably secured to one end of said first and second flow lines having seal rings disposed therebetween creating a fluidtight seal and being movable between a first open position to accept connection of said second flow line and a second closed position securing said second flow line thereto by the application of hydraulic pressure thereto, said connector comprising:

body means having
- a bore therethrough having, in turn, an annular recess at each end thereof which receives a portion of each of said seal rings therein to facilitate the fluidtight relationship between said connector and said first and second flow lines,
- a first flanged end portion,
- a threaded portion on the exterior thereof,
- an annular recess in the exterior thereof having, in turn, an annular circumferential rib therein,
- a second flanged end portion having, in turn, an angular annular shoulder thereon and annular recess in the end surface thereof, and
- abutment piston means secured to the threaded portion on the exterior of the body means;

cylinder sleeve means disposed about the body means and slidably sealingly engaging the abutment piston means and the exterior of the body means, the cylinder sleeve means comprising:

cylindrical sleeve means having
- first annular end cap piston means secured to one end thereof having, in turn, an annular tubular member secured thereto slidingly sealingly engaging the exterior portion of the body means,
- first fluid port means located adjacent the first annular end cap piston means between the annular end cap piston means and the abutment piston means secured to the exterior of the body means,
- second end cap piston means secured to the interior thereof intermediate the ends of the cylinder sleeve means,
- second fluid port means located adjacent the second end cap piston means between the second end cap piston means and the abutment piston means secured on the exterior of the body means, and
- lug cone forcing means secured to the other end thereof having, in turn, flange ring means secured thereto;

segmental lug means pivotally mounted about the body means having a portion thereof pivotally engaging the circumferential rib on the body means and a portion thereof adapted to engage said second flow line, the segmental lug means comprising:
a plurality of elongate members, each elongate member including,
on the interior thereof,
a first tapered surface, a recess which receives a portion of the annular circumferential rib of the body means therein, a first flat horizontal area, a second tapered surface which abuts a portion of the angular annular shoulder on the second flanged end of the body means, a second flat horizontal area, a third tapered surface adapted to engage a portion of said second flow line and a fourth tapered surface adapted to engage a portion of said second flow line, and
on the exterior thereof,
a first flat horizontal surface, first tapered surface terminating in a recess, a second tapered surface and a second flat horizontal area; and
segmental spring retainer means retained within the recess in the exterior of each elongate member of the segmental lug means
whereby said hydraulically actuated connector is closed by the application of said hydraulic pressure to the second fluid port means of the cylinder sleeve means while venting the first fluid port means thereby moving said connector from said first open position wherein the lug cone forcing means of the cylinder sleeve means engages the first tapered surface on the exterior of each elongate member of the segmental lug means causing the first tapered surface on the interior thereof to abut a portion of the annular recess in the exterior of the body means to said second closed position wherein the second and third tapered surfaces on the interior of each elongate member of the segmental lug means engage a portion, respectively of said angular annular shoulder on said second end and a portion on said second flow line and the lug cone forcing means engages the second tapered surface on the exterior of each elongate member of the segmental lug means, the cylinder sleeve means moving with respect to the body means by the translation of the cylinder sleeve means along the body means by the application of said hydraulic pressure to the second fluid port, and is opened by the application of said hydraulic pressure to the first fluid port means of the cylinder sleeve means while venting said second fluid port means thereby moving said connector from said second closed position wherein the lug cone forcing means of the cylinder sleeve means engages the second tapered surface on the exterior of each elongate member of the segmental lug means causing portions of each elongate member of the segmental lug means to engage portions of said flow line to said first open position having the lug cone forcing means of the cylinder sleeve means engaging the first tapered surface on the exterior of each elongate member of the segmental lug means, the cylinder sleeve means moving with respect to the body means by the translation of the cylinder sleeve means along the body means by the application of said hydraulic pressure to the first fluid port means.

2. The hydraulically actuated connector of claim 1 wherein
the abutment piston means of the body means includes seal means disposed therein to cause the abutment piston means to sealingly engage the body means and the cylindrical sleeve means of the cylinder sleeve means;
the first annular end cap piston means and the annular tubular member secured thereto of the cylinder sleeve means includes seal means disposed therein to cause the first annular end cap piston means and the tubular member secured thereto to sealingly engage the body means; and the second end cap piston means of the cylinder sleeve means includes seal means disposed therein to cause the second end cap piston means to sealingly engage the body means and the cylindrical sleeve means of the cylinder sleeve means.

3. The hydraulically actuated connector of claim 1 further comprising:
spacing means secured to each elongate member of the segmental lug means to distribute the elongate members of the segmental lug means about the body means.

* * * * *